US007685383B2

(12) United States Patent
Arai et al.

(10) Patent No.: US 7,685,383 B2
(45) Date of Patent: Mar. 23, 2010

(54) VEHICLE DATA BACKUP METHOD

(75) Inventors: Kenji Arai, Higashimatsuyama (JP); Akira Sekiguchi, Higashimatsuyama (JP)

(73) Assignee: Bosch Corporation, Tokyo (JP)

( * ) Notice: Subject to any disclaimer, the term of this patent is extended or adjusted under 35 U.S.C. 154(b) by 374 days.

(21) Appl. No.: 10/589,334

(22) PCT Filed: Feb. 3, 2005

(86) PCT No.: PCT/JP2005/001981

§ 371 (c)(1), (2), (4) Date: Apr. 2, 2007

(87) PCT Pub. No.: WO2005/078264

PCT Pub. Date: Aug. 25, 2005

(65) Prior Publication Data

US 2007/0283110 A1 Dec. 6, 2007

(30) Foreign Application Priority Data

Feb. 13, 2004 (JP) ............................ 2004-036082

(51) Int. Cl.
*G06F 12/00* (2006.01)

(52) U.S. Cl. ...................................... 711/162; 711/156

(58) Field of Classification Search ................. 711/162, 711/154, 156, 1
See application file for complete search history.

(56) References Cited

U.S. PATENT DOCUMENTS

| | | | | |
|---|---|---|---|---|
| 5,430,793 | A * | 7/1995 | Ueltzen et al. | 379/93.29 |
| 6,173,417 | B1 * | 1/2001 | Merrill | 714/15 |
| 7,203,581 | B2 * | 4/2007 | Okada | 701/35 |
| 2004/0143695 | A1 * | 7/2004 | Hashimoto et al. | 711/1 |

FOREIGN PATENT DOCUMENTS

JP 2003-056398 2/2003

OTHER PUBLICATIONS

A Stability Control by Active Angle Control of Front-Wheel in a Vehicle System Ohara, H.; Murakami, T.; Industrial Electronics, IEEE Transactions on vol. 55, Issue 3, Mar. 2008 pp. 1277-1285 Digital Object Identifier 10.1109/TIE.2007.909051.*

International Search Report No. PCT/JP2005/001981, dated Mar. 15, 2005, 2 pgs.

* cited by examiner

*Primary Examiner*—Pierre-Michel Bataille
(74) *Attorney, Agent, or Firm*—Connolly Bove Lodge & Hutz LLP

(57) ABSTRACT

In a vehicular system (1) configured such that data can be transmitted and received via a data bus (4) between an engine electronic control unit (2) for controlling an engine and electronic units (3-1 to 3-n) including a data storing function, the most recent content of accumulated data stored in the engine electronic control unit (2) is stored as backup data in the electronic units (3-1 to 3-n) via the data bus (4) at an appropriate timing, and when the engine electronic control unit (2) is replaced, the necessary backup data is transferred via the data bus (4) from any of the electronic units to an engine electronic control unit (2) after replacement.

4 Claims, 3 Drawing Sheets

VEHICLE DATA BACKUP METHOD

This application is a National Phase of PCT/JP2005/001981, filed Feb. 3, 2005, which claims priority to JP 2004-036082, filed Feb. 13, 2004.

TECHNICAL FIELD

The present invention relates to a method of backing up various types of data used in the control of the running of a vehicle and the like.

BACKGROUND ART

One of the required functions of an engine electronic control unit (ECU) is, for example, to prevent the deterioration of engine performance and exhaust emissions by estimating the over-time degradation of parts inside related systems and correcting the estimated over-time degradation. For this reason, as a method for estimating the over-time degradation of parts, a system has been realized where the ECU stores the running condition of the engine/vehicle in an internal memory and conducts the required estimation with a given algorithm using this data. It can be expected that this type of function will be expanded even more as regulations on exhaust emissions become stricter in the future. In this manner, in conventional ECUs for vehicle or engine control, a system configuration is employed where, in addition to initialization data being stored, various types of data obtained in response to the running of the vehicle are accumulated, and control of respective parts is appropriately executed using this accumulated data.

Consequently, when such a system is employed and the ECU fails due to whatever trouble, it is necessary to first retrieve the target data inside the failed ECU with some means such as a dedicated tool and once again store the data in a new ECU with which the failed ECU is to be replaced, in order for the data that had been stored up until that point to be continuously used. However, when the portion inside the ECU for conducting communication with this tool fails, the target data can no longer be retrieved.

As technology that solves this problem, JP-A-6-19532 discloses a data backup system where plural sequencers that control equipment are connected via a transmission path. The data backup system includes a backup sequencer and command transmitting means that transmits a write command to the backup sequencer. The backup sequencer is connected to each of the sequencers via the transmission path, constantly backs up/stores backup target data of each of the sequencers, and transmits to, and writes in, the corresponding sequencers the backed up/stored data on the basis of the write command from the command transmitting means.

However, this prior art requires a special tool because it is configured to constantly back up/store the required data in the backup sequencer, and has the problem that the configuration becomes complicated and necessarily expensive.

It is an object of the present invention to provide an improved vehicular data backup method that can solve the aforementioned problem in the prior art.

DISCLOSURE OF THE INVENTION

The present invention is configured to transmit and store, at a predetermined timing using a vehicle LAN such as a CAN, accumulated data stored in a certain ECU, such as engine running time data and running history data for estimating over-time degradation of parts, in another ECU installed in the same vehicle, so that even after the certain ECU is replaced as a result of the certain ECU failing, the most recent accumulated data prior to the failure of the ECU can be maintained without being lost.

The present invention is characterized in that, in a method of backing up vehicular data in a vehicular system that includes an engine electronic control unit for controlling an engine and at least one electronic unit including a data storing function, with the vehicular system being configured such that data can be transmitted and received between the engine electronic control unit and the electronic unit via a vehicular communication network, the most recent content of accumulated data stored in the engine electronic control unit is stored as backup data in the electronic unit via the vehicular communication network at an appropriate timing, and when the engine electronic control unit is replaced, the backup data is transferred via the vehicular communication network to an engine electronic control unit after replacement. The backup data can be stored in one specific electronic unit, but it can also be divided and stored among plural electronic units, or the same backup data can be stored in plural electronic units.

BEST MODE FOR IMPLEMENTING THE INVENTION

The present invention will now be described in greater detail in accordance with the attached drawings.

Figure 1:
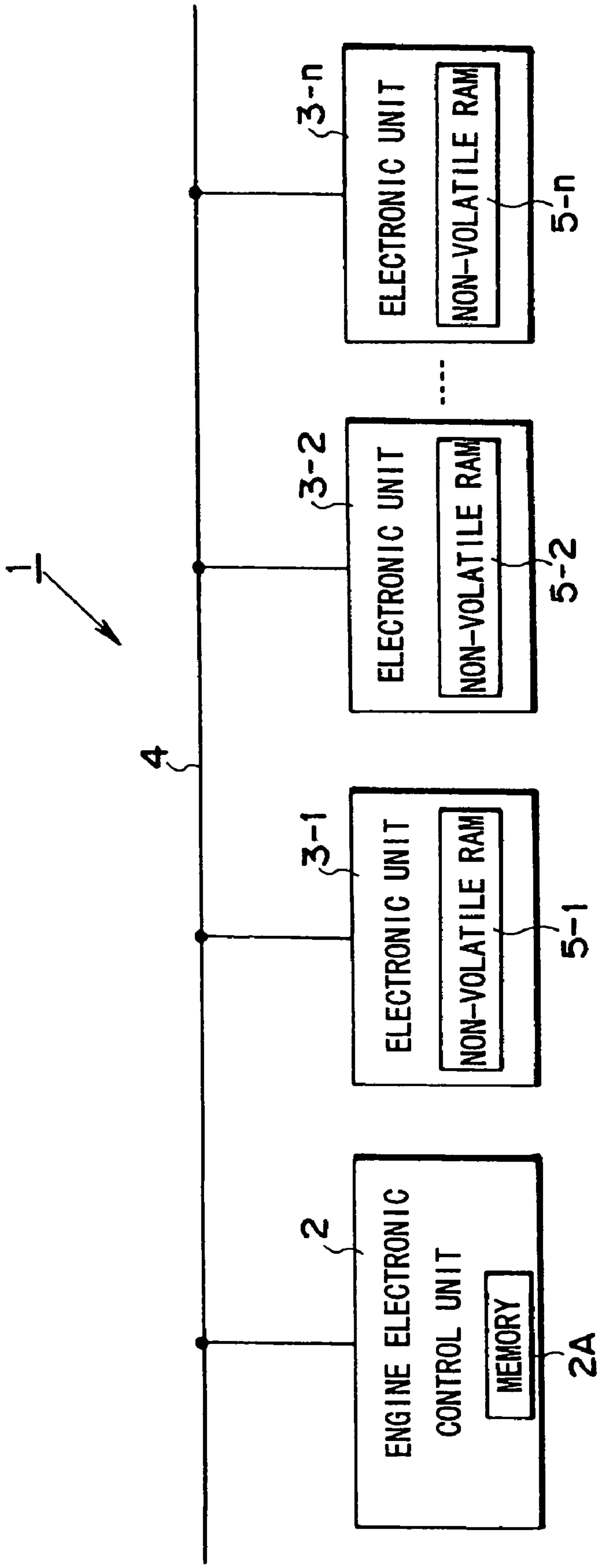
FIG. 1 is a configural diagram showing an embodiment of a vehicular system according to the present invention.

FIG. 1 is a configural diagram of a vehicular system configured such that data stored in an engine electronic control unit for controlling the running of an engine for driving a vehicle is backed up by the method of the present invention.

A vehicular system 1 includes an engine electronic control unit 2 for electronically controlling the running of a vehicular engine (not shown) and plural electronic units 3-1, 3-2, . . . , 3-*n* that are installed in a transmission, an air conditioner, and an acoustic device and the like installed in the vehicle in order to control these. These units are communicably interconnected via a data bus 4 for an on-board LAN. The engine electronic control unit 2 and the electronic units 3-1 to 3-*n* include a communication function and a data storing function, and these units are configured to be able to mutually transmit and receive data with optional units via the data bus 4. Here, an on-board LAN is described as an example of an on-board communication network for data communication inside each unit, but another on-board communication network can also be used.

The electronic units 3-1 to 3-*n* are respectively disposed with non-volatile RAMs 5-1 to 5-*n* as non-volatile memories, and necessary data is stored in the corresponding non-volatile RAMs in the respective units. Thus, even when a situation arises where the supply of power stops, the stored data is not lost.

In the engine electronic control unit 2, engine running time data and running history data for estimating the over-time degradation of parts are updated at an appropriate timing, and the updated data is stored as accumulated data in a memory 2A. The control of the running of the engine in the engine electronic control unit 2 is executed with reference to this accumulated data and configured such that execution of control that is always optimum to the engine is ensured.

In order to back up the most recent content of the aforementioned accumulated data, the accumulated data stored in the memory 2A of the engine electronic control unit 2 is transmitted to the electronic units 3-1 to 3-*n* via the data bus 4 at an appropriate timing and stored as backup data in the non-volatile RAMs 5-1 to 5-*n* of each unit.

It will be noted that the backup data of the accumulated data may also of course be stored in any one of the electronic units. However, by ensuring that the backup data is stored in all of the electronic units 3-1 to 3-*n* as in the present embodiment, the reliability of the backup data becomes higher, which is preferable. In this case, it is preferable to assign a priority order to the plural backup data.

The transmission of the backup data of the accumulated data from the engine electronic control unit 2 to the electronic units 3-1 to 3-*n* can also be periodically conducted by a computer program installed in the engine electronic control unit 2. The interval of the transmission of the backup data can be 10 μsec, for example. However, it is not necessary for the transmission of the backup data from the engine electronic control unit 2 to the electronic units 3-1 to 3-*n* to be conducted periodically; this transmission can also be conducted each time an engine key (not shown) of the vehicle is switched from OFF to ON, for example.

Figure 2:
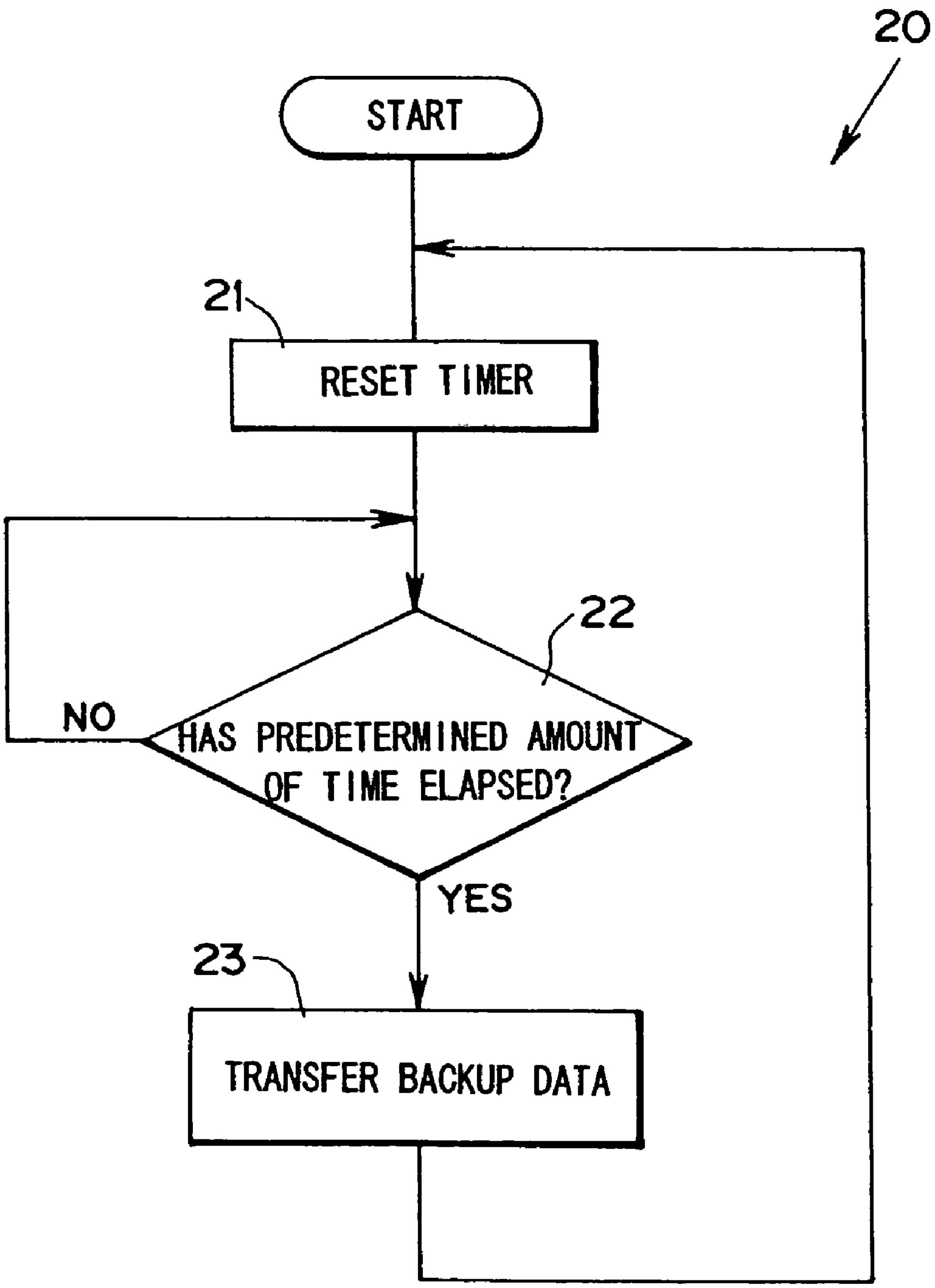
FIG. 2 is a flow chart showing an example of a backup data transfer program.

FIG. 2 is a flow chart showing an example of a backup data transfer program. A backup data transfer program 20 is started by switching the engine key from OFF to ON. When the backup data transfer program is started, first, a timer is reset in step 21, and it is determined by the value of the timer in step 22 whether or not a predetermined amount of time (e.g., 10 μsec) has elapsed. If the predetermined amount of time has not elapsed, then the result of the determination in step 22 becomes NO and step 22 is again executed. In this manner, if the predetermined amount of time has elapsed, then the result of the determination in step 22 becomes YES, the program proceeds to step 23, and backup data transfer is executed where the accumulated data in the memory 2A is transmitted to the non-volatile RAMs 5-1 to 5-*n* of the electronic units 3-1 to 3-*n*. After the execution of step 23, the program returns to step 21, the timer is reset, and the above-described operation is repeated.

The engine electronic control unit 2 also includes a function for causing the backup data stored in the non-volatile RAMs 5-1 to 5-*n* of the electronic units 3-1 to 3-*n* to be transferred to the engine electronic control unit 2 when the engine electronic control unit 2 is first installed in the vehicular system 1.

Figure 3:
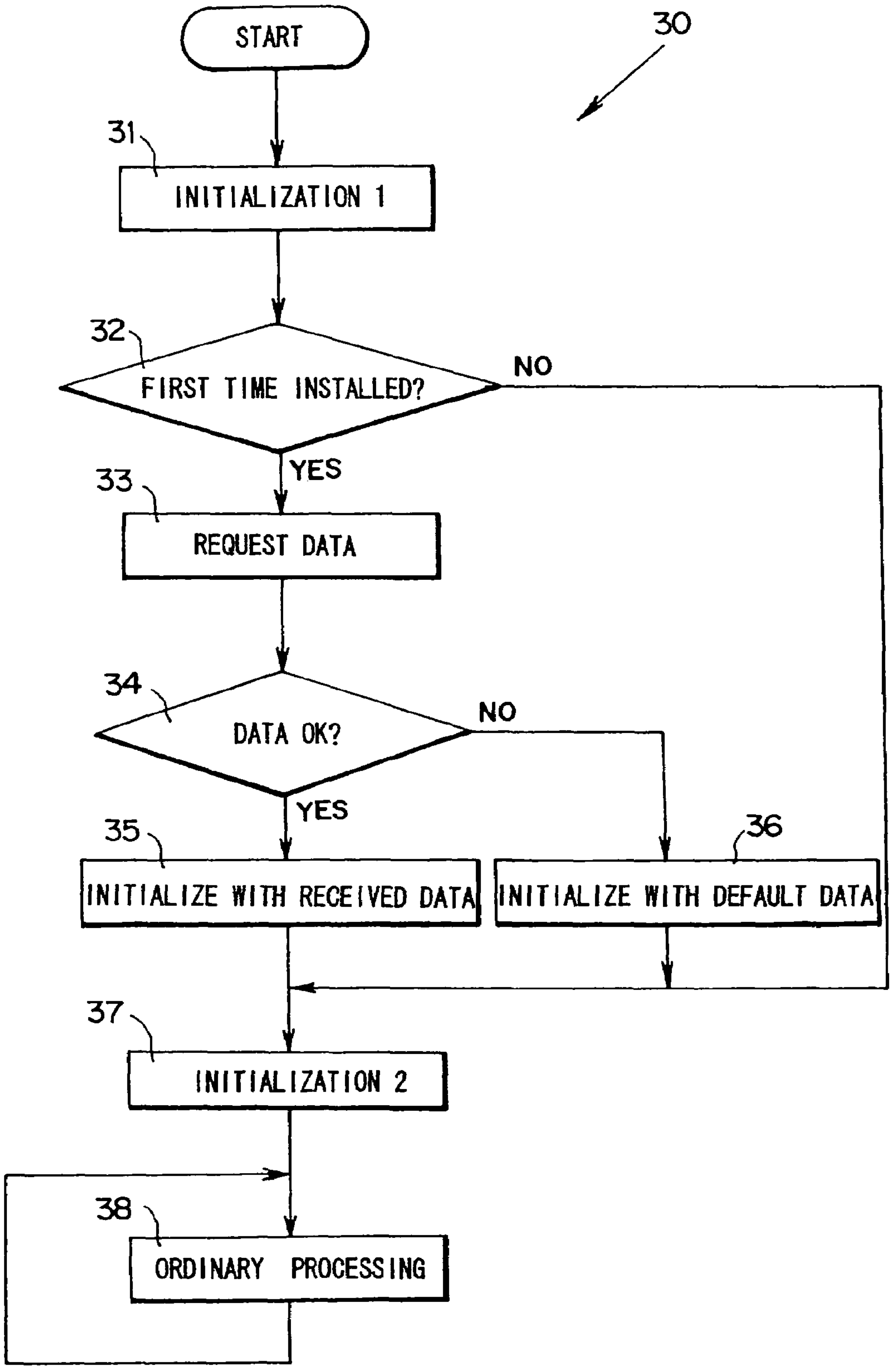
FIG. 3 is a flow chart showing an example of an engine control program executed in an engine electronic control unit shown in FIG. 1.

FIG. 3 is a flow chart showing an example of an engine control program including this transfer control function. An engine control program 30 is started as a result of the engine electronic control unit 2 being installed in the vehicular system 1 and a power switch being switched ON.

First, in step 31, initialization 1 for initializing the installed engine electronic control unit 2 is conducted, and default values for control are set. After the initialization 1 has been conducted, the program proceeds to step 32. In step 32, it is determined whether or not this is the first time the engine electronic control unit 2 has been installed. A flag that can recognize the fact that this is the first time the engine electronic control unit 2 has been installed is provided in the engine electronic control unit 2. When it has been determined that this is the first time the engine electronic control unit 2 has been installed, then the result of the determination in step 32 becomes YES and the program proceeds to step 33.

In step 33, a data request is conducted where the engine electronic control unit 2 requests backup data from any of the electronic units 3-1 to 3-*n*. This data request can be conducted in accordance with the predetermined priority order. The given electronic unit that has received the request from the engine electronic control unit 2 to transmit backup data transmits the stored backup data to the engine electronic control unit 2.

In step 34, it is determined whether or not the received backup data is OK, i.e., whether or not the data is data of a predetermined format. When it has been determined that the data is OK, then the result of the determination in step 34 becomes YES and the program proceeds to step 35. In step 35, the engine electronic control unit 2 initializes itself with the received backup data. When it has not been determined in step 34 that the received data is OK, then the result of the determination in step 34 becomes NO and the program proceeds to step 36. In step 36, the engine electronic control unit 2 is initialized with default data, and thereafter the program proceeds to step 37.

In step 37, initialization 2 is conducted. In step 37, initialization is executed using the data stored by the engine electronic control unit 2 when the result of the determination in step 32 is NO (not the first time the engine electronic control unit 2 has been installed), or initialization is executed using the data sent from any of the electronic units when the result of the determination in step 32 is YES (the first time the engine electronic control unit 2 has been installed) because the data that the engine electronic control unit 2 includes is invalid. After the initialization 2 has been conducted, the program proceeds to step 38. In step 38, ordinary processing for controlling the running of the engine is conducted.

When it has been determined in step 32 that this is not the first time the engine electronic control unit 2 has been installed, then the result of the determination in step 32 becomes NO, steps 33 to 36 are not executed, and the program proceeds directly to step 37.

In the vehicular system 1, ordinarily the backup data is appropriately transferred by a known method from the engine electronic control unit 2 to the other plural electronic units 3-1 to 3-*n* using the data bus 4 of the on-board LAN. Then, the electronic units 3-1 to 3-*n* store the backup data from the data bus 4 in the corresponding non-volatile RAMs 5-1 to 5-*n*.

When an engine electronic control unit fails during use, the failed engine electronic control unit is replaced with a normal engine electronic control unit 2 without any special procedure, and the normal engine electronic control unit 2 recognizes the fact that this is the first time the engine electronic control unit 2 has been installed in the vehicular system 1 as a result. Then, the engine electronic control unit 2 requests any of the electronic units 3-1 to 3-*n* to transmit backup data in accordance with the given priority order using the data bus 4 of the on-board LAN. The electronic unit receiving the request transmits the stored backup data to the engine electronic control unit 2. The engine electronic control unit 2 executes initialization using the transmitted backup data and thereafter updates the data.

It will be noted that when the assembly of the vehicle is completed, the operation when the engine electronic control unit 2 has been replaced prior to the completion of data transfer to the electronic units 3-1 to 3-*n* is as follows. A flag showing the fact that the backup data has been normally stored is provided in the electronic unit storing the backup data of the engine electronic control unit 2. Consequently, when the electronic unit receives a request from the engine electronic control unit 2 to transmit the backup data, the electronic unit checks this flag, and when backup data has not been normally stored in that unit, then the electronic unit returns data-not-stored information to the engine electronic control unit 2. When the engine electronic control unit 2 receives the data-not-stored information from the electronic unit, then the engine electronic control unit 2 conducts initialization with the default values set in the memory 2A. Thereafter, processing that is the same as that during normal operation is repeated.

In this manner, because backup data is stored in electronic units that have already been disposed for other purposes in the same vehicular system, an engine electronic control unit that has replaced another engine electronic control unit is automatically initialized with the past data that has been accumulated up until now, without using a special tool. Further, even when an engine electronic control unit goes into a critical failure mode, initialization can be done with the past data that has been accumulated up until now after the engine electronic control unit is replaced.

INDUSTRIAL APPLICABILITY

According to the present invention, the backup of vehicular data can be reliably conducted without requiring a special tool, which is useful to the improvement of vehicular electronic control systems.

The invention claimed is:

1. A method of backing up vehicular data in a vehicular system that includes an engine electronic control unit for controlling an engine and a plurality of electronic units including a data storing function, each of the electronic units being arranged so as to be separated from the engine electronic control unit, with the vehicular system being configured such that data can be transmitted and received between the engine electronic control unit and the electronic units via a vehicular communication network, the method comprising:

recognizing with a flag, in the engine electronic control unit, a first time the engine electronic control unit is installed;

storing the most recent content of accumulated data including an engine running time data and a running history data in the engine electronic control unit and as backup data in the electronic units via the vehicular communication network at an appropriate time;

transferring, when the engine electronic control unit is replaced, the backup data via the vehicular communication network to a replaced engine electronic control unit from any of the electronic units with reference to the flag provided in the replaced engine electronic unit; and initializing the replaced engine electronic unit with the backup data transferred via the vehicular communication network.

2. The vehicular data backup method of claim 1, further comprising demanding a transferring of the backup data from any of the electronic units when the engine electronic control unit has been replaced; and when it has been determined that the backup data which has been transferred from any of the electronic units when the engine electronic control unit has been replaced cannot be used, initializing the engine electronic control unit with default data.

3. The vehicular data backup method of claim 2, wherein the default data is stored in a memory in the engine electronic control unit.

4. The vehicular data backup method of claim 1, wherein a non-volatile memory is disposed in the electronic unit, and the backup data is stored in the non-volatile memory.

* * * * *